(12) United States Patent
Sakano et al.

(10) Patent No.: US 6,552,152 B2
(45) Date of Patent: Apr. 22, 2003

(54) CURABLE FLUOROPOLYETHER RUBBER COMPOSITIONS

(75) Inventors: Yasunori Sakano, Usui-gun (JP); Shinichi Sato, Usui-gun (JP); Koichi Yamaguchi, Usui-gun (JP); Noriyuki Koike, Usui-gun (JP); Masatoshi Arai, Usui-gun (JP); Hirofumi Kishita, Usui-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/893,603

(22) Filed: Jun. 29, 2001

(65) Prior Publication Data

US 2002/0077451 A1 Jun. 20, 2002

(30) Foreign Application Priority Data

Jun. 29, 2000 (JP) ........................................ 2000-196789

(51) Int. Cl.$^7$ .......................... C08G 77/12; C08G 77/24
(52) U.S. Cl. .............................. 528/42; 528/31; 528/15; 528/25
(58) Field of Search .............................. 528/25, 31, 15, 528/42

(56) References Cited

U.S. PATENT DOCUMENTS 5,475,078 A * 12/1995 Sato et al. .................... 528/16

FOREIGN PATENT DOCUMENTS

| EP | 0725113 A1 | 8/1996 |
| EP | 0967251 A1 | 12/1999 |
| JP | 2990646 | 10/1999 |

OTHER PUBLICATIONS

English Abstract of JP–A 8–199070.

* cited by examiner

Primary Examiner—Margaret G. Moore
Assistant Examiner—Marc S Zimmer
(74) Attorney, Agent, or Firm—Millen, White, Zelano, & Branigan, P.C.

(57) ABSTRACT

A curable fluoropolyether rubber composition comprising (A) a straight-chain fluoropolyether compound having at least two alkenyl groups and a perfluoropolyether structure backbone, (B) an organosilicon compound having at least two silicon atom-bonded hydrogen atoms, which all form H—SiCH$_2$— structures, and (C) a hydrosilylation catalyst cures into parts which have good heat resistance, chemical resistance, solvent resistance, parting property, water repellency, oil repellency and weather resistance as well as improved acid and alkali resistance and are useful as sealants.

22 Claims, No Drawings

CURABLE FLUOROPOLYETHER RUBBER COMPOSITIONS

This invention relates to curable fluoropolyether rubber compositions which cure into parts having good water repellency, oil repellency, heat resistance, solvent resistance, chemical resistance, weather resistance and parting property as well as improved acid resistance.

BACKGROUND OF THE INVENTION

Japanese Patent No. 2,990,646 (JP-A 8-199070) discloses a composition comprising (A) a straight-chain fluoropolyether compound having at least two alkenyl groups in a molecule and a perfluoroalkyl ether structure in the backbone, (B) an organosilicon compound having at least two H—SiOSi structures in a molecule, and (C) a hydrosilylation catalyst, which cures into parts having a good profile of heat resistance, chemical resistance, solvent resistance, parting property, water repellency, oil repellency and weather resistance.

Although this fluoropolyether rubber composition performs well in most applications, a need for higher acid resistance exists in special applications associated with semiconductors, engine oils and the like where acid resistance is necessary.

SUMMARY OF THE INVENTION

An object of the invention is to provide curable fluoropolyether rubber compositions which cure into parts having good heat resistance, chemical resistance, solvent resistance, parting property, water repellency, oil repellency and weather resistance as well as improved acid resistance.

It has been found that by compounding (A) a straight-chain fluoropolyether compound having at least two alkenyl groups in a molecule and a perfluoropolyether structure in the backbone, (B) an organosilicon compound having in a molecule at least two silicon atom-bonded hydrogen atoms, which all form H—SiCH$_2$— structures, and (C) a hydrosilylation catalyst, there is obtained a curable fluoropolyether rubber composition which cures into parts having good heat resistance, chemical resistance, solvent resistance, parting property, water repellency, oil repellency and weather resistance as well as improved acid resistance.

Fluoropolyether rubber compositions using an organosilicon compound having H—SiOSi structures as disclosed in Japanese Patent No. 2,990,646 are not so strong against acid since the SiOSi linkage can undergo silicon-oxygen cleavage under the action of acid. By contrast, in the organosilicon compound having H—SiCH$_2$— structures, the silicon-carbon bond is highly stable against acid. Thus use of the organosilicon compound having H—SiCH$_2$— structures provides a fluoropolyether rubber composition with excellent acid resistance.

Accordingly the invention provides a curable fluoropolyether rubber composition comprising (A) a straight-chain fluoropolyether compound having at least two alkenyl groups in a molecule and a perfluoropolyether structure in the backbone, (B) an organosilicon compound having in a molecule at least two silicon atom-bonded hydrogen atoms, which all form H—Si(CH$_2$)$_c$— structures, wherein c=1 to 4, and (C) a hydrosilylation catalyst.

DESCRIPTION OF THE PREFERRED EMBODIMENT

Component (A) of the curable fluoropolyether rubber composition according to the invention is a straight-chain fluoropolyether compound having at least two alkenyl groups in a molecule and a divalent perfluoroalkyl ether structure in the backbone.

The perfluoroalkyl ether structure may be a structure comprising a multiplicity of recurring units: —C$_d$F$_{2d}$O— wherein d in each unit is independently an integer of 1 to 6, for example, a structure of the following general formula (5):

$$(C_dF_{2d}O)_q \tag{5}$$

wherein q is an integer of 1 to 500, preferably 2 to 400, and more preferably 10 to 200.

The recurring units —C$_d$F$_{2d}$O— constituting the structure of formula (5) are exemplified by the following units:

—CF$_2$O—,
—CF$_2$CF$_2$O—,
—CF$_2$CF$_2$CF$_2$O—,
—CF(CF$_3$)CF$_2$O—,
—CF$_2$CF$_2$CF$_2$CF$_2$O—,
—CF$_2$CF$_2$CF$_2$CF$_2$CF$_2$CF$_2$O—, and
—C(CF$_3$)$_2$O—, Of these, —CF$_2$O—, —CF$_2$CF$_2$O—, —CF$_2$CF$_2$CF$_2$O— and —CF(CF$_3$)CF$_2$O— are especially preferred. It is noted that the perfluoroalkyl ether structure may be comprised of such recurring units of one type or a combination of two or more types.

The alkenyl groups in the straight-chain fluoropolyether compound (A) are preferably those groups having 2 to 8 carbon atoms, especially 2 to 6 carbon atoms, and terminated with a CH$_2$=CH— structure, for example, vinyl, allyl, propenyl, isopropenyl, butenyl, and hexenyl. Of these, vinyl and allyl are preferred. The alkenyl groups may be located at any position within the molecule, but preferably attached to opposite ends of the molecular chain. In this preferred arrangement, the alkenyl groups may be attached to opposite ends of the straight-chain fluoropolyether compound backbone directly or through a divalent linking group: —CH$_2$—, —CH$_2$O— or —Y—NR—CO—. Herein Y is —CH$_2$— or a group of the following structural formula (Z):

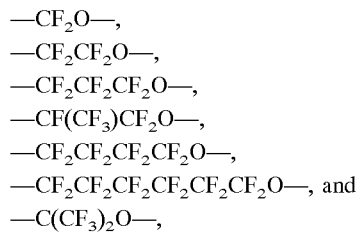

(Z)

(wherein the free valence bond may be at the o, m or p-position), and R is hydrogen, methyl, phenyl or allyl.

The fluoropolyether compound (A) is preferably a straight-chain one of the following general formula (2) or (3).

$$CH_2=CH-(X)_p-Rf^o-(X)_p-CH=CH_2 \tag{2}$$

$$CH_2=CH-(X)_p-Q-Rf^o-Q-(X)_p-CH=CH_2 \tag{3}$$

Herein X is independently —CH$_2$—, —CH$_2$O— or —Y—NR'—CO— wherein Y is —CH$_2$— or a group of the following structural formula (Z):

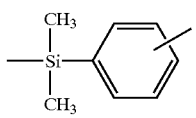

(Z)

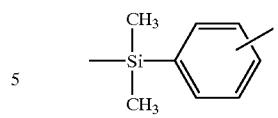

(Z)

(o, m or p-position), and R' is hydrogen, methyl, phenyl or allyl. $Rf^o$ is a divalent perfluoropolyether structure, preferably of the formula (5), that is, $(C_dF_{2d}O)_q$. Letter p is independently 0 or 1. Q is a divalent hydrocarbon group of 1 to 15 carbon atoms which may contain an ether bond, for example, an alkylene group or an alkylene group containing an ether bond.

Of these straight-chain fluoropolyether compounds (A), those of the following general formula (4) are preferred.

(o, m or p-position), and R' is hydrogen, methyl, phenyl or allyl. Letter p is independently 0 or 1, r is an integer of 1 to 6, u is an integer of 2 to 6, and m and n each are an integer of 0 to 200.

Desirably the straight-chain fluoropolyether compounds of formula (4) have a weight average molecular weight of about 4,000 to 100,000, more desirably about 1,000 to 50,000.

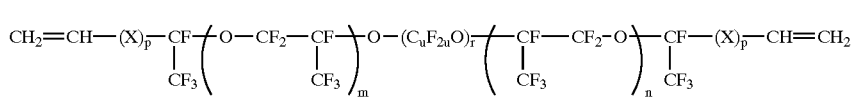

(4)

Herein X is independently —$CH_2$—, —$CH_2O$— or —Y—NR'—CO— wherein Y is —$CH_2$— or a group of the following structural formula (Z):

Illustrative, non-limiting, examples of the straight-chain fluoropolyether compounds of formula (4) are given below. In the formulas, m and n are as defined above.

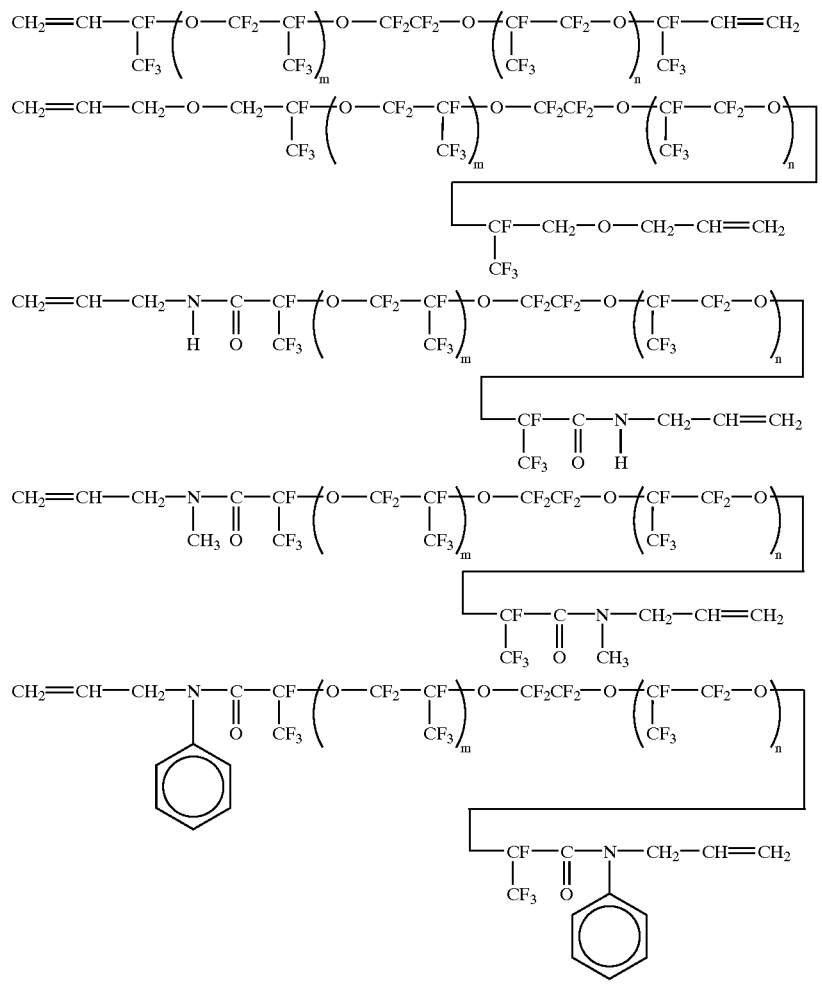

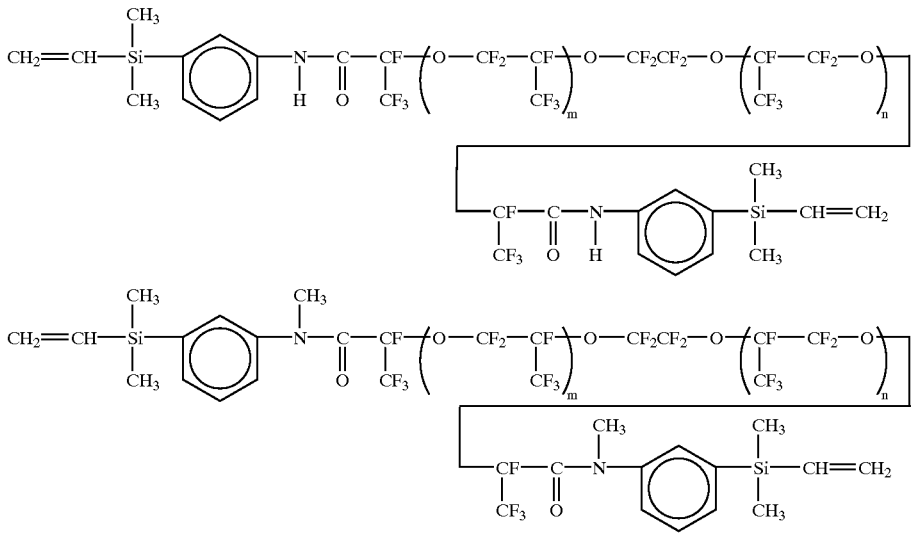

In the practice of the invention, to tailor the straight-chain fluoropolyether compound of formula (4) to a weight average molecular weight desired for a particular purpose, it is possible that the straight-chain fluoropolyether compound be previously subjected to hydrosilylation reaction with an organosilicon compound having two SiH groups in a molecule by a conventional method under ordinary conditions to form a chain-extended product, which can be used as component (A).

Component (B) serves as a crosslinking agent and chain extender for component (A). Any desired organosilicon compound may be used as long as it has at least two silicon atom-bonded hydrogen atoms in a molecule in which every silicon atom-bonded hydrogen atom forms an H—Si(CH$_2$)$_c$, wherein c=1 to 4, structure. The organosilicon compound is preferably of the following general formula (1).

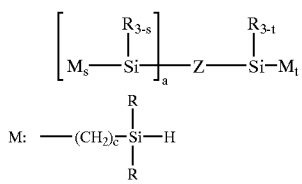

(1)

Herein c is 1, 2, 3 or 4. R is a monovalent hydrocarbon group of 1 to 20 carbon atoms, preferably 1 to 6 carbon atoms, and may be the same or different. Z is hydrogen or —Q—M, —Q—Rf, —Q—, —Rf'— or —Q—Rf'—Q— wherein Q is a divalent hydrocarbon group of 1 to 15 carbon atoms which may contain an ether bond, Rf is a monovalent perfluoroalkyl or perfluorooxyalkyl group, and Rf' is a divalent perfluoroalkylene or perfluorooxyalkylene group. Letter s is 1, 2 or 3, t is 0, 1, 2 or 3, and a and b each are 0 or 1, with the proviso that a and b are not 0 at the same time.

The hydrocarbon groups represented by R will be described later in detail. Examples of Q include alkylene groups such as methylene, ethylene, propylene and hexylene, and those alkylene groups whose chain is separated by an ether bond (—O—). The monovalent perfluoroalkyl and perfluorooxyalkyl groups represented by Rf and the divalent perfluoroalkylene and perfluorooxyalkylene groups represented by Rf' will also be described later in detail.

Illustrative examples of the organosilicon compound are given below. In the formulas, Me is methyl.

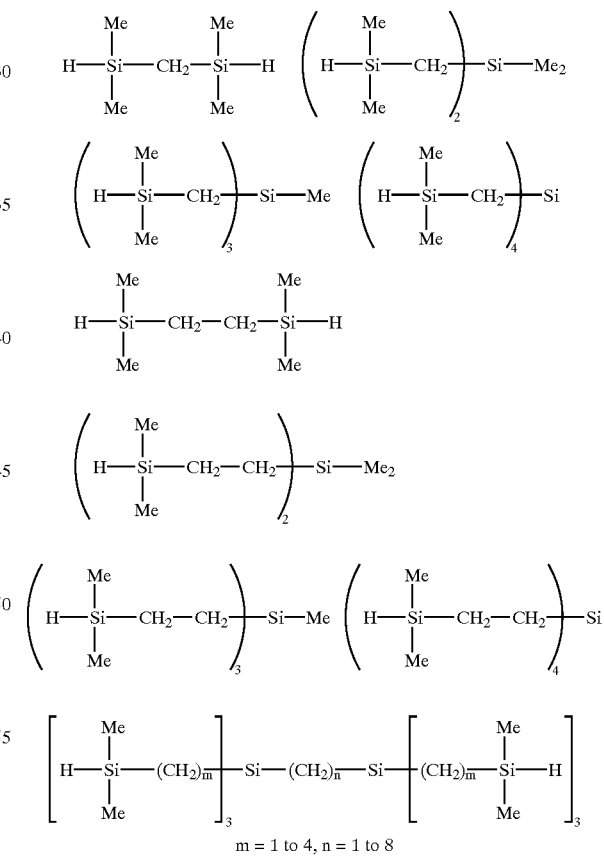

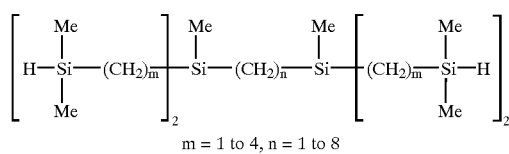

m = 1 to 4, n = 1 to 8

-continued

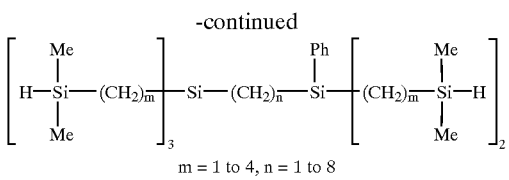

m = 1 to 4, n = 1 to 8

In consideration of compatibility with and dispersibility in component (A) and uniformity after curing, there may be used those organosilicon compounds having at least one monovalent perfluoroalkyl, monovalent perfluorooxyalkyl, divalent perfluoroalkylene or divalent perfluorooxyalkylene group in a molecule.

The perfluoroalkyl, perfluorooxyalkyl, perfluoroalkylene and perfluorooxyalkylene groups are exemplified by those of the following general formulas. Monovalent perfluoroalkyl

g is an integer of 1 to 20, preferably 2 to 10. Divalent perfluoroalkylene

g is an integer of 1 to 20, preferably 2 to 10. Monovalent perfluorooxyalkyl

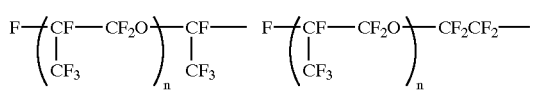

n is an integer of 1 to 5. Divalent perfluorooxyalkylene

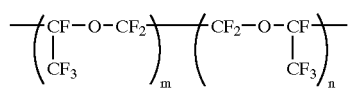

The sum of m+n is an integer of 1 to 200.

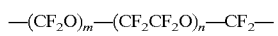

Each of m and n is an integer of 1 to 50.

These perfluoro(oxy)alkyl and perfluoro(oxy)alkylene groups may be attached to silicon atoms either directly or through divalent linking groups. Such divalent linking groups are alkylene and arylene groups and combinations thereof, which may have an intervening bond such as an ether bond-forming oxygen atom, amide bond, carbonyl bond or the like. Illustratively, divalent linking groups having 2 to 12 carbon atoms are preferred, examples of which are given below.

—CH$_2$CH$_2$—
—CH$_2$CH$_2$CH$_2$—
—CH$_2$CH$_2$CH$_2$OCH$_2$—
—CH$_2$CH$_2$CH$_2$—NH—C—
—CH$_2$CH$_2$CH$_2$—N(Ph)—C—
—CH$_2$CH$_2$CH$_2$—N(CH$_3$)—C—
—CH$_2$CH$_2$CH$_2$—O—C—

Note that Ph is phenyl.

In addition to the monovalent organic group containing a mono- or divalent fluorinated substituent, that is, perfluoroalkyl, perfluorooxyalkyl, perfluoroalkylene or perfluorooxyalkylene group, the organosilicon compound (B) has the silicon atom-bonded monovalent substituent R, which is selected from substituted or unsubstituted hydrocarbon groups of 1 to 20 carbon atoms. Exemplary hydrocarbon groups are alkyl groups such as methyl, ethyl, propyl, butyl, hexyl, cyclohexyl, octyl and decyl, alkenyl groups such as vinyl and allyl, aryl groups such as phenyl, tolyl and naphthyl, aralkyl groups such as benzyl and phenylethyl, and substituted ones of the foregoing groups in which some hydrogen atoms are substituted with chlorine atoms, cyano groups or the like, such as chloromethyl, chloropropyl and cyanoethyl.

With respect to the organosilicon compound, the number of silicon atoms per molecule is usually about 2 to about 60, preferably about 3 to about 30, though not limited thereto.

The following examples are also typical of the organosilicon compounds. They may be used alone or in admixture of two or more. Note that Me is methyl and Ph is phenyl.

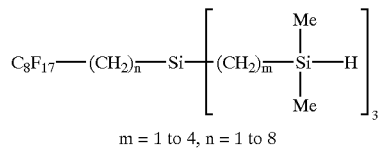

m = 1 to 4, n = 1 to 8

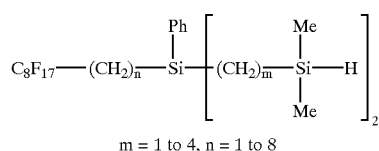

m = 1 to 4, n = 1 to 8

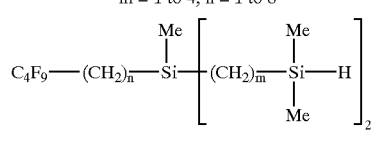

m = 1 to 4, n = 1 to 8

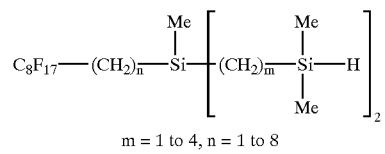

m = 1 to 4, n = 1 to 8

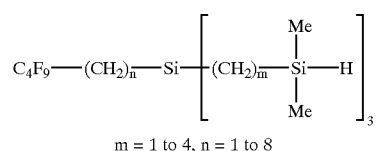

m = 1 to 4, n = 1 to 8

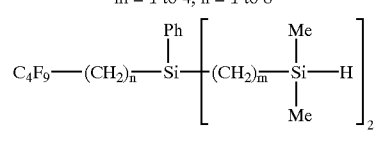

m = 1 to 4, n = 1 to 8

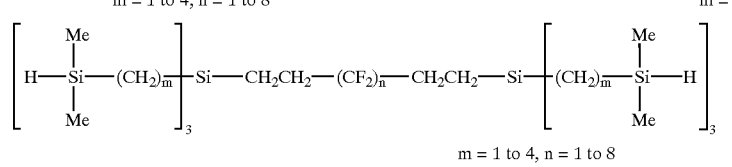

m = 1 to 4, n = 1 to 8

-continued

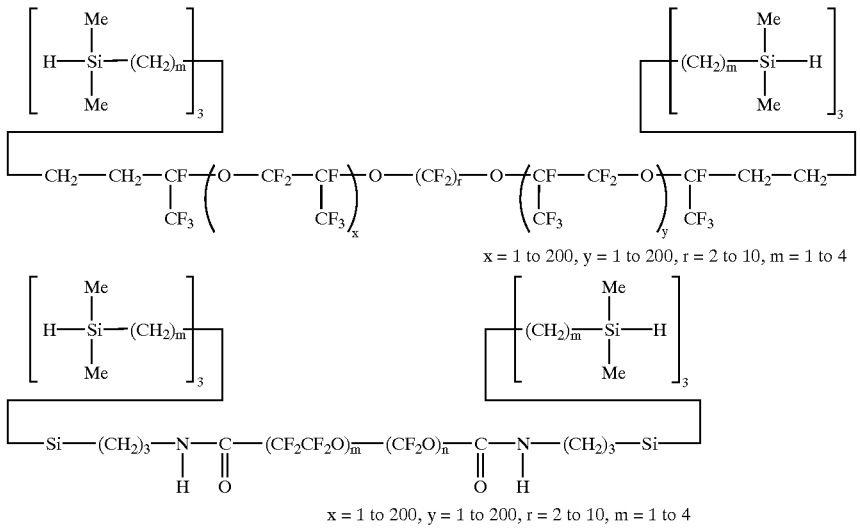

x = 1 to 200, y = 1 to 200, r = 2 to 10, m = 1 to 4 x = 1 to 200, y = 1 to 200, r = 2 to 10, m = 1 to 4

An appropriate amount of component (B) blended is such that 0.5 to 5 mol, especially 1 to 2 mol of hydrosilyl groups (or SiH groups) in component (B) are available per mol of alkenyl groups (e.g., vinyl, allyl and cycloalkenyl) in component (A). Less amounts of component (B) may achieve an insufficient degree of crosslinking whereas excessive amounts of component (B) may allow chain lengthening to become preferential, inviting short curing and foaming, and aggravating heat resistance, compression set and the like.

Component (C) is a hydrosilylation catalyst, which is typically selected from transition metals, for example, platinum group metals such as Pt, Rh and Pd and compounds of these transition metals. Because these compounds are generally expensive noble metal compounds, the invention favors the use of platinum compounds which are readily available.

Exemplary platinum catalysts are chloroplatinic acid, complexes of chloroplatinic acid with olefins such as ethylene, and complexes of chloroplatinic acid with alcohols and vinylsiloxane, as well as platinum on silica, alumina and carbon, though not limited thereto.

Platinum group metal compounds other than the platinum compounds include rhodium, ruthenium, iridium and palladium compounds, for example, $RhCl(PPh_3)_3$, $RhCl(CO)(PPh_3)_2$, $RhCl(C_2H_4)_2$, $Ru_3(CO)_{12}$, $IrCl(CO)(PPh_3)_2$, and $Pd(PPh_3)_4$ wherein Ph is phenyl.

The amount of the catalyst used is not critical and a catalytic amount may achieve a desired curing rate. From the economical standpoint and to obtain satisfactory cured parts, the catalyst amount is preferably about 0.1 to 1,000 ppm, more preferably about 0.1 to 500 ppm of platinum group metal based on the entire curable composition.

In addition to component (B), the curable composition of the invention may have another crosslinking agent and chain extender for component (A). Specifically, an organosilicon compound having in a molecule at least two SiH structures not corresponding to component (B), typically H—Si—OSi structures, may be blended for ease of working and tailoring rubber physical properties. Such a SiH-bearing organosilicon compound not corresponding to component (B) is not critical as long as it has at least two SiH groups in a molecule. It may have a chain, cyclic or network structure.

Where an organosilicon compound having hydrosilyl groups or SiH groups is added as a crosslinking agent and chain extender for component (A) in addition to component (B), the amount of this additional organosilicon compound is preferably such that the total amount of SiH groups (available from component (B) and additional organosilicon compound) is 0.5 to 5 mol, especially 1 to 2 mol per mol of alkenyl groups (e.g., vinyl, allyl and cycloalkenyl) in component (A). Less amounts of SiH groups may achieve an insufficient degree of crosslinking whereas excessive amounts of SiH groups may allow chain lengthening to become preferential, inviting short curing and foaming, and aggravating heat resistance, compression set and the like.

The proportion of component (B) to the additional organosilicon compound having SiH structures is not critical and may be set as appropriate depending on a particular application.

If desired, various additives may be added to the inventive curable composition for improving its practical usage. For instance, polysiloxanes containing $CH_2=CH(R)SiO$ units wherein R is hydrogen or a substituted or unsubstituted monovalent hydrocarbon group (see JP-B 48-10947) and acetylene compounds (see U.S. Pat. No. 3,445,420 and JP-B 4-3774) are added for the purpose of controlling the curing rate of the curable compositions. Other useful additives are ionic compounds of heavy metals (see U.S. Pat. No. 3,532,649).

To the curable composition of the invention, fillers may be added for the purposes of reducing thermal shrinkage upon curing, reducing the coefficient of thermal expansion of the cured elastomer, improving thermal stability, weather resistance, chemical resistance, flame retardance or mechanical strength, and/or lowering the gas permeability. Exemplary additives include fumed silica, quartz flour, glass fibers, carbon, metal oxides such as iron oxide, titanium oxide and cerium oxide, and metal carbonates such as calcium carbonate and magnesium carbonate. If desired, suitable pigments and dyes are added.

The method of preparing the curable composition according to the invention is not critical. The composition may be prepared simply by mixing the above-described components. The composition may be formulated as two parts, one part consisting of component (A) and components (B) and (C) and the other part consisting of components (A) and (C), which are to be combined together on use. For the composition to cure, room temperature cure is possible depending on the type of functional group in component (A) and the type of catalyst (C) although a common, preferred practice is to heat the composition at about 100 to 200° C. for several minutes to several hours for curing.

On use, depending on its particular application and purpose, the curable composition may be dissolved in a suitable fluorochemical solvent, for example, 1,3-bistrifluoromethylbenzene or perfluorooctane in a desired concentration before it is applied.

The curable fluoropolyether rubber composition cures into parts which have good heat resistance, chemical resistance, solvent resistance, parting property, water repellency, oil repellency and weather resistance as well as improved acid and alkali resistance. The composition is mi thus useful in a variety of molding applications, for example, as sealants for semiconductor manufacturing apparatus, O-rings, diaphragms and sealants for automobiles and aircraft, roll materials for copiers, and constituent materials for secondary cells and fuel cells.

EXAMPLE

Examples of the invention are given below by way of illustration and not by way of limitation. The viscosity is a measurement at 25° C. All parts are by weight.

Example 1

To 100 parts of a polymer of formula (i) below (viscosity 8,500 cs, average molecular weight 22,000, and vinyl content 0.009 mol/100 g) was added 20 parts of dimethylsiloxy-treated fumed silica having a specific surface area of 200 m²/g. They were mixed, heat treated and milled on a three-roll mill. To the mixture were added 2.64 parts of a fluorinated organosilicon compound of formula (ii) below, 0.2 part of a toluene solution of a catalyst in the form of chloroplatinic acid modified with $CH_2=CHSiMe_2OSiMe_2CH=CH_2$ (platinum concentration 1.0 wt %), and 0.4 part of a 50% toluene solution of ethynyl cyclohexanol. They were mixed to give composition I. It was deaerated in vacuum, placed in a rectangular frame of 2 mm deep, deaerated again, and press cured at 100 kg/cm² and 150° C. for 10 minutes. From the cured sample, a specimen was cut out and measured for physical properties according to JIS K-6251 and 6253. The results are shown below.

The specimen was also examined for heat resistance, chemical resistance, solvent swell, low-temperature property and moisture permeability. The results are shown in Table 1 to 5.

Comparative Example 1

Composition II was prepared as in Example 1 except that 2.49 parts of a fluorinated hydrogensiloxane of formula (iii) was used instead of the fluorinated organosilicon compound of formula (ii). As in Example 1, a cured sheet was obtained from composition II. A specimen was cut therefrom and measured for physical properties according to JIS K-6251 and 6253. The results are shown below.

| Hardness (Durometer type A) | 41 |
|---|---|
| Elongation | 620% |
| Tensile strength | 11.8 MPa |

$$C_8F_{17}-CH_2-CH_2-Si-(O-\underset{Me}{\overset{Me}{Si}}-H)_3 \quad \text{(iii)}$$

The specimen was also examined for chemical resistance, with the results shown in Table 2.

TABLE 1

| | Heat resistance (200° C.) | | |
|---|---|---|---|
| | Initial | 3 days | 7 days |
| Hardness (Durometer type A) | 40 | 39 | 38 |
| Elongation (%) | 540 | 500 (−7%) | 450 (−17%) |
| Tensile strength (MPa) | 10.7 | 8.9 (−17%) | 6.7 (−37%) |
| Heat loss (%) | — | 1 | 1.9 |

| Hardness (Durometer type A) | 40 |
|---|---|
| Elongation | 540% |
| Tensile strength | 10.7 MPa |

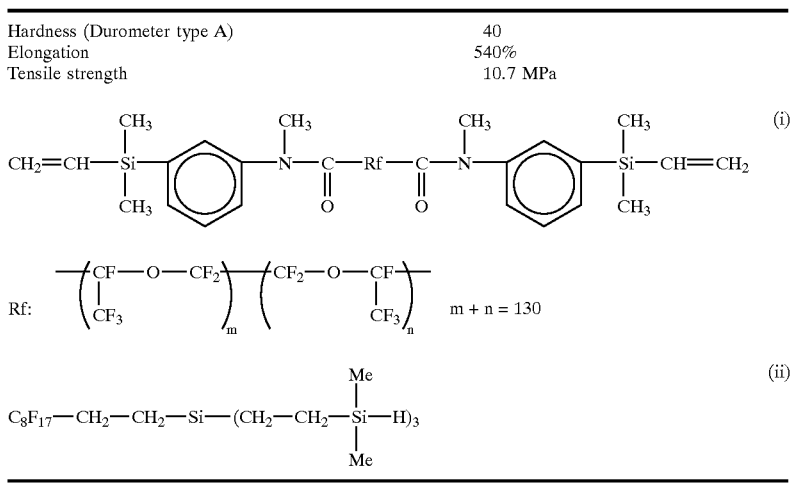

TABLE 2

Chemical resistance (Change of rubber hardness)

| Chemical | Example 1 Composition I Hardness | Example 1 Composition I Surface state | Comparative Example 1 Composition II Hardness | Comparative Example 1 Composition II Surface state |
|---|---|---|---|---|
| Initial | 40 | — | 41 | — |
| Conc. hydrochloric acid | 42 (+2) | unchanged | 48 (+7) | unchanged |
| Conc. sulfuric acid | 39 (−1) | unchanged | 40 (−1) | deteriorated |
| Conc. hydrofluoric acid | 39 (−1) | unchanged | 30 (−11) | deteriorated |
| Trifluoroacetic acid | 38 (−2) | unchanged | decomposed | decomposed |
| 40% aqueous KOH solution | 41 (+1) | unchanged | 41 (+0) | unchanged |

Figures in parentheses indicate increases/decreases of hardness point from the initial.
Attack conditions: 20° C./3 days It is evident from Table 2 that composition I has superior acid resistance to composition II.

TABLE 3

Solvent swell (volume change %)

| Solvent | Composition I | Viton GFLT | FE61 |
|---|---|---|---|
| gasoline | +10 | +5 | +42 |
| methanol | +2 | +16 | +1 |
| chloroform | +12 | +12 | +23 |
| acetone | +7 | +148 | +177 |
| toluene | +7 | +10 | +30 |
| IPA | +4 | +1 | +1 |
| acetonitrile | +1 | +46 | +3 |
| MEK | +15 | +150 | +194 |
| ethyl acetate | +13 | +150 | +172 |
| THF | +18 | +149 | +204 |
| n-hexane | +7 | +2 | +18 |
| carbon tetrachloride | +10 | +4 | +27 |

Viton GFLT: fluoro-elastomer by E. I. Dupont
FE61: fluorosilicone rubber by Shin-Etsu Chemical Co., Ltd.

TABLE 4

Low-temperature property (German torsion test)

| | Composition I | Viton E-60 | KE951 |
|---|---|---|---|
| $T_2$ | −36° C. | −6° C. | −41° C. |
| $T_5$ | −47° C. | −11° C. | −43° C. |
| $T_{10}$ | −53° C. | −14° C. | −44° C. |
| $T_{100}$ | −61° C. | −20° C. | −50° C. |

Viton E-60: fluoro-elastomer by E. I. Dupont
KE951: fluorosilicone rubber by Shin-Etsu Chemical Co., Ltd.

TABLE 5

Moisture permeability (CUP method)

| Sample | Moisture permeability |
|---|---|
| Composition I | 4 |
| KE951 | 100 |
| Viton GFLT | 4 |
| FE251 | 50 |

Conditions: 40° C./90% RH (unit, g/m² · 24 hr)
KE951: fluorosilicone rubber by Shin-Etsu Chemical Co., Ltd.
Viton GFLT: fluoro-elastomer by E. I. Dupont
FE251: fluorosilicone rubber by Shin-Etsu Chemical Co., Ltd.

Example 2

A composition was prepared as in Example 1 except that a polymer of formula (iv) (viscosity 5,300 cs, average molecular weight 17,000, and vinyl content 0.012 mol/100 g) was used instead of the polymer of formula (i) and the amount of the fluorinated organosilicon compound was changed to 3.53 parts. As in Example 1, a cured sheet was obtained from this composition. A specimen was cut therefrom and measured for physical properties according to JIS K-6251 and 6253. The results are shown below.

| | |
|---|---|
| Hardness (Durometer type A) | 45 |
| Elongation | 420% |
| Tensile strength | 10.2 MPa |

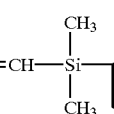

Example 3

A composition was prepared as in Example 1 except that 100 parts of a polymer of formula (v) (viscosity 136,000 cs, average molecular weight 23,300, and vinyl content 0.008 mol/100 g) was used instead of the polymer of formula (i) and the amount of the fluorinated organosilicon compound was changed to 2.30 parts. As in Example 1, a cured sheet was obtained from this composition. A specimen was cut therefrom and measured for physical properties according to JIS K-6251 and 6253. The results are shown below.

| | |
|---|---|
| Hardness (Durometer type A) | 35 |
| Elongation | 540% |
| Tensile strength | 11.2 MPa |

(v)

$$CH_2=CH-\underset{\underset{CH_3}{|}}{\overset{\overset{CH_3}{|}}{Si}}-\bigcirc-\underset{\underset{|}{C=O}}{\overset{\overset{CH_3}{|}}{N}}-\left[Rf-\overset{\overset{O}{\|}}{C}-Q-\overset{\overset{O}{\|}}{C}\right]_3-Rf-\overset{\overset{O}{\|}}{C}-\underset{\underset{|}{}}{\overset{\overset{CH_3}{|}}{N}}-\bigcirc-\underset{\underset{CH_3}{|}}{\overset{\overset{CH_3}{|}}{Si}}-CH=CH_2$$

$$Rf: \left(\left(CF-O-CF_2\atop\underset{CF_3}{|}\right)_m\left(CF_2-O-CF\atop\underset{CF_3}{|}\right)_n\right) \quad m+n=35$$

$$Q: -\underset{|}{\overset{\overset{H}{|}}{N}}-CH_2-CH_2-CH_2-\underset{\underset{O}{|}}{\overset{\overset{CH_3}{|}}{Si}}-O-\underset{\underset{O}{|}}{\overset{\overset{CH_3}{|}}{Si}}-CH_2CH_2CH_3$$
$$CH_3CH_2CH_2-\underset{\underset{CH_3}{|}}{Si}-O-\underset{\underset{CH_3}{|}}{Si}-CH_2-CH_2-CH_2-\underset{|}{\overset{\overset{H}{|}}{N}}-$$

The specimen was also examined for chemical resistance, with the results shown in Table 6.

Example 4

A composition was prepared as in Example 1 except that 100 parts of a polymer of formula (vi) (viscosity 87,000 as, average molecular weight 27,900, and vinyl content 0.007 mol/100 g) was used instead of the polymer of formula (i) and the amount of the fluorinated organosilicon compound was changed to 1.95 parts. As in Example 1, a cured sheet was obtained from this composition. A specimen was cut therefrom and measured for physical properties according to JIS K-6251 and 6253. The results are shown below.

| | |
|---|---|
| Hardness (Durometer type A) | 35 |
| Elongation | 530% |
| Tensile strength | 10.2 MPa |

(vi)

$$CH_2=CH-\underset{\underset{CH_3}{|}}{\overset{\overset{CH_3}{|}}{Si}}-\bigcirc-\underset{\underset{|}{C=O}}{\overset{\overset{CH_3}{|}}{N}}-\left[Rf-\overset{\overset{O}{\|}}{C}-Q-\overset{\overset{O}{\|}}{C}\right]_3-Rf-\overset{\overset{O}{\|}}{C}-\underset{\underset{|}{}}{\overset{\overset{CH_3}{|}}{N}}-\bigcirc-\underset{\underset{CH_3}{|}}{\overset{\overset{CH_3}{|}}{Si}}-CH=CH_2$$

$$Rf: \left(\left(CF-O-CF_2\atop\underset{CF_3}{|}\right)_m\left(CF_2-O-CF\atop\underset{CF_3}{|}\right)_n\right) \quad m+n=35$$

Q: piperazine ring with CH$_3$ substituents

The specimen was also examined for chemical resistance, with the results shown in Table 6.

Example 5

A composition was prepared as in Example 1 except that 1.69 parts of the fluorinated organosilicon compound of formula (ii) and 0.46 part of a fluorinated organosilicon compound of formula (vii) were used together. As in Example 1, a cured sheet was obtained from this composition. A specimen was cut therefrom and measured for physical properties according to JIS K-6251 and 6253. The results are shown below.

| | |
|---|---|
| Hardness (Durometer type A) | 55 |
| Elongation | 380% |
| Tensile strength | 9.7 MPa |

$$C_8F_{17}-CH_2-CH_2-Si-(CH_2-CH_2-\underset{\underset{Me}{|}}{\overset{\overset{Me}{|}}{Si}}-H)_3 \quad (ii)$$

$$(H-\underset{\underset{Me}{|}}{\overset{\overset{Me}{|}}{Si}}-CH_2-CH_2)_3-Si-(CH_2)_2-Si-(CH_2-CH_2-\underset{\underset{Me}{|}}{\overset{\overset{Me}{|}}{Si}}-H)_3 \quad (vii)$$

The specimen was also examined for chemical resistance, with the results shown in Table 7.

Example 6

A composition was prepared as in Example 1 except that 2.47 parts of a fluorinated organosilicon compound of formula (viii) were used instead of the fluorinated organosilicon compound of formula (ii). As in Example 1, a cured sheet was obtained from this composition. A specimen was cut therefrom and measured for physical properties according to JIS K-6251 and 6253. The results are shown below.

| | |
|---|---|
| Hardness (Durometer type A) | 37 |
| Elongation | 640% |
| Tensile strength | 9.3 MPa |

$$C_8F_{17}-CH_2-CH_2-Si-(CH_2-\underset{\underset{Me}{|}}{\overset{\overset{Me}{|}}{Si}}-H)_3 \quad (viii)$$

The specimen was also examined for chemical resistance, with the results shown in Table 7.

Example 7

To 100 parts of the polymer of formula (i) (viscosity 8,500 cs, average molecular weight 22,000, and vinyl content 0.009 mol/100 g) used in Example 1 was added 20 parts of dimethylsiloxy-treated fumed silica having a specific surface area of 200 m$^2$/g. They were mixed, heat treated and milled on a three-roll mill. To the mixture were added 1.06 parts of the fluorinated organosilicon compound of formula (ii) used in Example 1, 1.51 parts of the fluorinated hydrogensiloxane of formula (iii) used in Comparative Example 1, 0.2 part of a toluene solution of a catalyst in the form of chloroplatinic acid modified with $CH_2$=$CHSiMe_2$ $OSiMe_2CH$=$CH_2$ (platinum concentration 1.0 wt %), and 0.4 part of a 50% toluene solution of ethynyl cyclohexanol. They were mixed to give a composition. It was deaerated in vacuum, placed in a rectangular frame of 2 mm deep, deaerated again, and press cured at 100 kg/cm$^2$ and 150° C. for 10 minutes. From the cured sample, a specimen was cut out and measured for physical properties according to JIS K-6251 and 6253. The results are shown below.

| | |
|---|---|
| Hardness (Durometer type A) | 41 |
| Elongation | 590% |
| Tensile strength | 12 MPa |

The specimen was also examined for chemical resistance, with the results shown in Table 7.

TABLE 6

| | Example 2 | | Example 3 | | Example 4 | |
|---|---|---|---|---|---|---|
| Chemical | Hardness | Surface state | Hardness | Surface state | Hardness | Surface state |
| Initial | 45 | — | 35 | — | 35 | — |
| Conc. hydrochloric acid | 48 (+3) | unchanged | 39 (+4) | unchanged | 37 (+2) | unchanged |
| Conc. sulfuric acid | 43 (−2) | unchanged | 30 (−5) | unchanged | 33 (−2) | unchanged |
| Conc. hydrofluoric acid | 42 (−3) | unchanged | 26 (−9) | unchanged | 32 (−3) | unchanged |
| Trifluoroacetic acid | 41 (−4) | unchanged | 24 (−11) | unchanged | 32 (−3) | unchanged |
| 40% aqueous KOH solution | 47 (+2) | unchanged | 41 (+6) | unchanged | 38 (+3) | unchanged |

Figures in parentheses indicate increases/decreases of hardness point from the initial.
Attack conditions: 20° C./3 days

TABLE 7

|  | Example 5 | | Example 6 | | Example 7 | |
| --- | --- | --- | --- | --- | --- | --- |
| Chemical | Hardness | Surface state | Hardness | Surface state | Hardness | Surface state |
| Initial | 55 | — | 37 | — | 41 | — |
| Conc. hydrochloric acid | 57 (+2) | unchanged | 38 (+1) | unchanged | 44 (+3) | unchanged |
| Conc. sulfuric acid | 54 (−1) | unchanged | 36 (−1) | unchanged | 40 (−1) | unchanged |
| Conc. hydrofluoric acid | 53 (−2) | unchanged | 36 (−1) | unchanged | 37 (−4) | unchanged |
| Trifluoroacetic acid | 52 (−3) | unchanged | 36 (−1) | unchanged | 35 (−6) | deteriorated |
| 40% aqueous KOH solution | 58 (+3) | unchanged | 38 (+1) | unchanged | 41 (0) | unchanged |

Figures in parentheses indicate increases/decreases of hardness point from the initial.
Attack conditions: 20° C./3 days It is evident from Tables 2, 6 and 7 that the curable fluoropolyether rubber compositions using H—SiCH$_2$— type organosilicon compounds in Examples show excellent acid resistance as compared with the similar composition using an H—SiOSi type organosilicon compound in Comparative Example. Example 7 demonstrates that a combination of H—SiCH$_2$— and H—SiOSi types is also effective for improving acid resistance.

Japanese Patent Application No. 2000-196789 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A curable fluoropolyether rubber composition comprising
    (A) a straight-chain fluoropolyether compound having at least two alkenyl groups in a molecule and a perfluoropolyether structure in the backbone,
    (B) an organosilicon compound having in a molecule at least three silicon atom-bonded hydrogen atoms, which all form H—Si(CH$_2$)$_c$— structures wherein c=1–4, and
    (C) a hydrosilylation catalyst.

2. The composition of claim 1 wherein component (B) is an organosilicon compound of the following general formula (1):

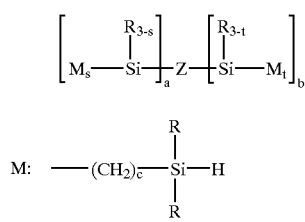

(1)

wherein c is 1, 2, 3 or 4,
R is a monovalent hydrocarbon group of 1 to 20 carbon atoms and may be the same or different,
Z is hydrogen or —Q—M, —Q—Rf, —Q—, —Rf'— or —Q—Rf'—Q— wherein Q is a divalent hydrocarbon group of 1 to 15 carbon atoms which may contain an ether bond, Rf is a monovalent perfluoroalkyl or perfluorooxyalkyl group, Rf' is a divalent perfluoroalkylene or perfluorooxyalkylene group,
s is 1, 2 or 3, t is 0, 1, 2 or 3, and a and b each are 0 or 1, with the proviso that a and b are not 0 at the same time.

3. The composition of claim 1 wherein component (A) is a straight-chain fluoropolyether compound of the following general formula (2) or (3):

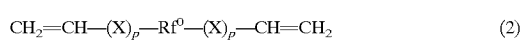 (2)

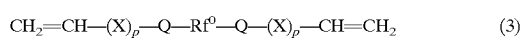 (3)

wherein X is independently —CH$_2$—, —CH$_2$O— or —Y—NR'—C— wherein Y is —CH$_2$— or a group of the following structural formula (Z):

(Z)

(o, m or p-position), and R' is hydrogen, methyl, phenyl or allyl,
Rf$^o$ is a divalent perfluoropolyether structure,
p is independently 0 or 1, and
Q is a divalent hydrocarbon group of 1 to 15 carbon atoms which may contain an ether bond.

4. The composition of claim 3 wherein component (A) is a straight-chain fluoropolyether compound of the following general formula (4):

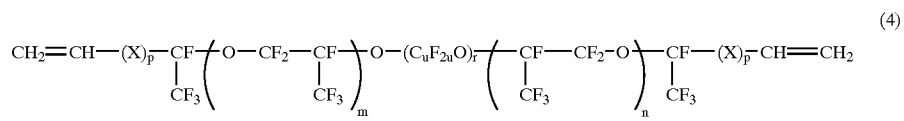

(4)

wherein X is independently —CH₂—, —CH₂O— or —Y—NR'—C— wherein Y is —CH₂— or a group of the following structural formula (Z):

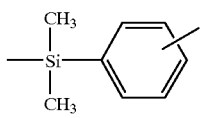

(o, m or p-position), and R' is hydrogen, methyl, phenyl or allyl, p is independently 0 or 1, r is an integer of 1 to 6, u is an integer of 2 to 6, and m and n each are an integer of 0 to 200.

5. The composition of claim 1 wherein component (B) is an organosilicon compound of the following general formula (1):

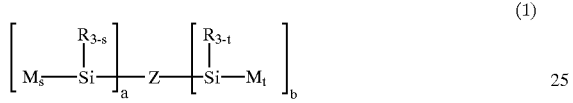

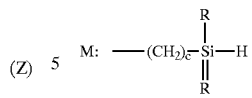

wherein c is 1, 2, 3 or 4,

R is a monovalent hydrocarbon group of 1 to 20 carbon atoms and may be the same or different, Z is hydrogen or —Q—M, —Q—Rf, —Q—, —Rf'— or —Q—Rf—Q— wherein Q is a divalent hydrocarbon group of 1 to 15 carbon atoms which may contain an ether bond, Rf is a monovalent perfluoroalkyl or perfluorooxyalkyl group, Rf' is a divalent perfluoroalkylene or perfluorooxyalkylene group, s is 1, 2 or 3, t is 0, 1, 2 or 3, and a and b each are 0 or 1, with the proviso that a and b are not 0 at the same time, s and t are 3 when either one of a and b is 0, and s+t is at least three when both a and b are 1.

6. The composition according to claim 1, wherein the component B is

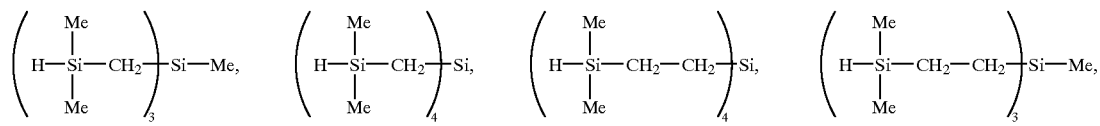

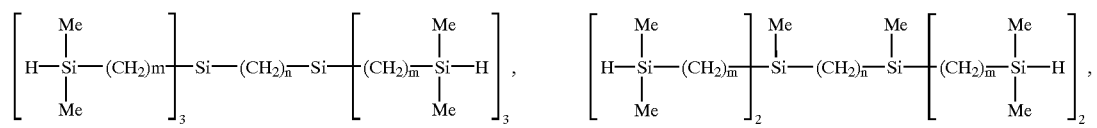

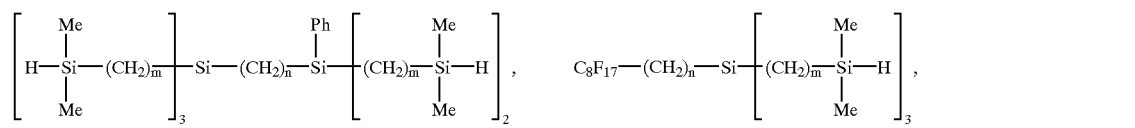

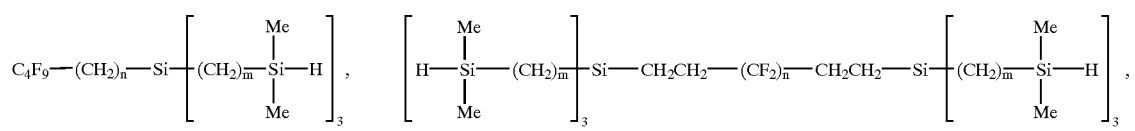

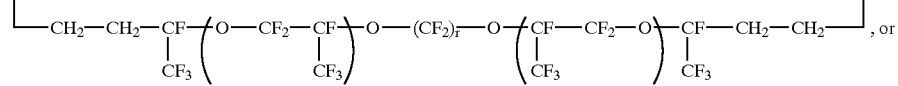, or

-continued

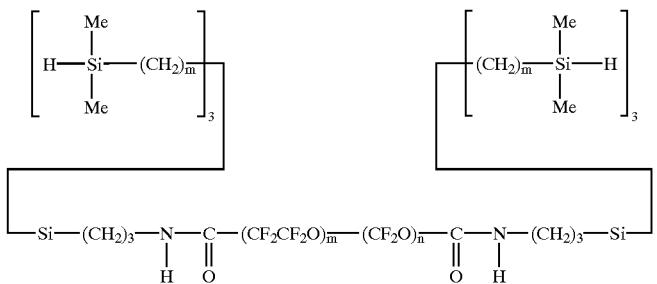

where: Me is methyl, m=1 to 4, n=1 to 8, x=1 to 200, y=1 to 200, and r=2 to 10.

7. The composition of claim 1, made by blending 0.5–5 mol of hydrosilyl groups in component (B) per mol of alkenyl groups in component (A).

8. The composition of claim 1, made by blending 1–2 mol of hydrosilyl groups in component (B) per mol of alkenyl groups in component (A).

9. The composition according to claim 4, wherein the straight-chain fluoropolyether compound of the general formula (4) has a weight average molecular weight of 4,000–100,000.

10. The composition according to claim 4, wherein the straight-chain fluoropolyether compound of the general formula (4) has a weight average molecular weight of 1,000–50,000.

11. The composition of claim 1, wherein the hydrosilylation catalyst (C) comprises Pt, Rh, Pd, or a transistion metal.

12. The composition of claim 11, wherein the hydrosilylation catalyst (C) is a platinum catalyst comprising a chloroplatinic acid, a chloroplatinic acid olefin complex, a chloroplatinic acid alcohol and vinylsiloxane complex, platinum on silica, platinum on alumina, or platinum on carbon.

13. The composition according to claim 11, wherein the hydrosilylation catalyst (C) comprises $RhCl(PPh_3)_3$, $RhCl(CO)(PPh_3)_2$, $RhCl(C_2H_4)_2$, $Ru_3(CO)_{12}$, $IrCl(CO)(PPh_3)_2$ or $Pd(PPh_3)_4$ wherein Ph is phenyl.

14. The composition according to claim 1, further comprising an organosilicon comprising at least two H—Si—OSi structures.

15. A curable fluoropolyether rubber composition made by blending:

(A) straight-chain fluoropolyether compound of the following general formula (4):

wherein X is independently —$CH_2$—, —$CH_2O$— or —Y—NR'—CO— wherein Y is —$CH_2$— or a group of the following structural formula (Z):

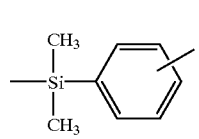

(o, m or p-position), and R' is hydrogen, methyl, phenyl or allyl, p is independently 0 or 1, r is an integer of 1 to 6, u is an integer of 2 to 6, and m and n each are an integer of 0 to 200, (B) an organosilicon compound having in a molecule at least two silicon atom-bonded hydrogen atoms, which all form H—$Si(CH_2)_c$— structures wherein c=1 to 4, and (C) a hydrosilylation catalyst.

16. A curable fluoropolyether rubber composition made by blending:

a straight-chain fluoropolyether compound having at least two alkenyl groups in a molecule and a perfluoropolyether structure in the backbone, (B) an organosilicon compound having in a molecule at least three silicon atom-bonded hydrogen atoms, which all form H—$Si(CH_2)_c$— structures wherein c=1–4, and (C) a hydrosilylation catalyst.

17. The composition according to claim 16, made by blending a compound of formula (i)

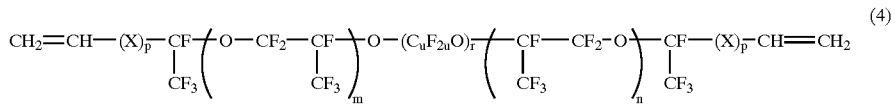

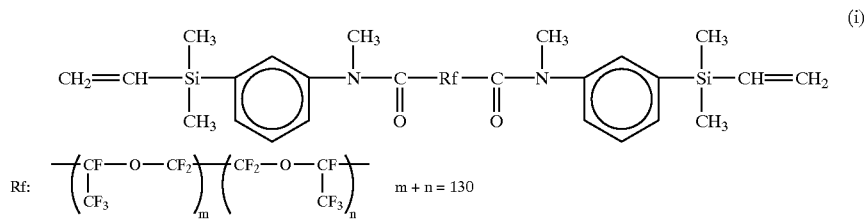

a compound of formula (ii)

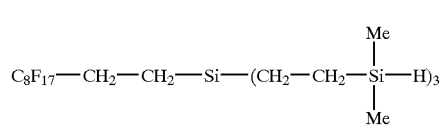

where Me is methyl; and a modified chloroplatinic acid catalyst.

18. The composition according to claim 16, made by blending a compound of formula (iv)

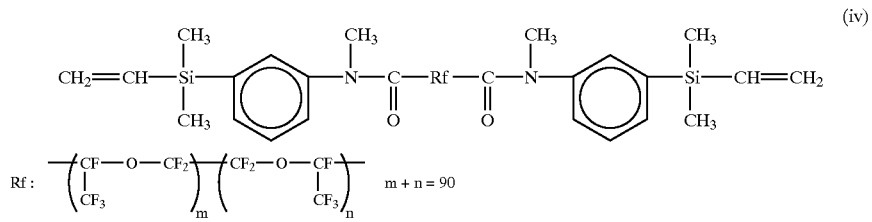

a compound of formula (ii)

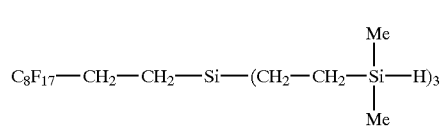

where Me is methyl; and a modified chloroplatinic acid catalyst.

19. The composition according to claim 16, made by blending a compound of the formula (v)

a compound of formula (ii)

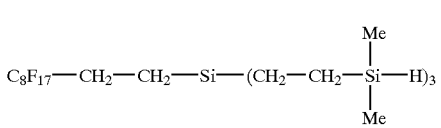

where Me is methyl; and a modified chloroplatinic acid catalyst.

20. The composition according to claim 16, made by blending a compound of formula (vi)

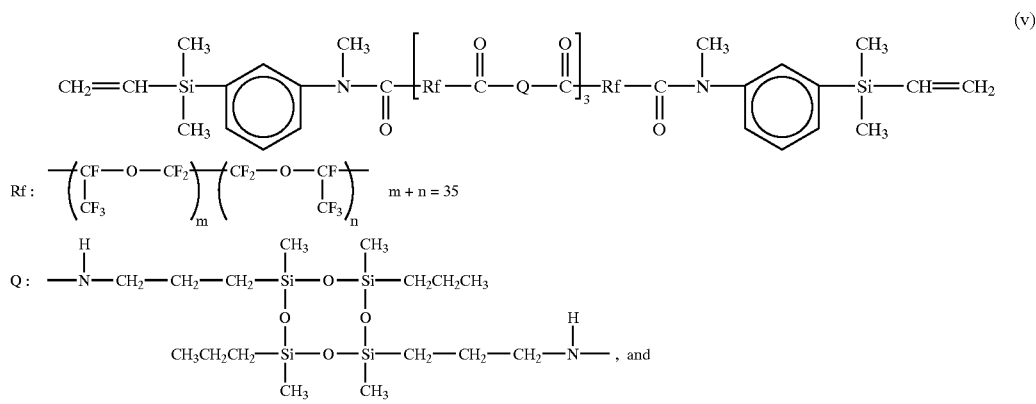

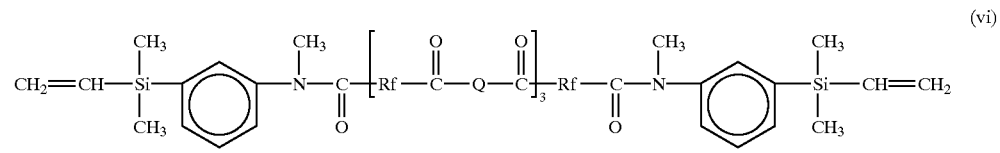

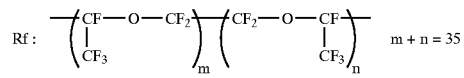

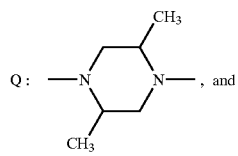

a compound of formula (ii)

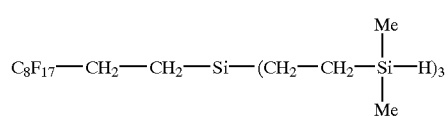

where Me is methyl; and a modified chloroplatinic acid catalyst.

a compound of formula (vii)

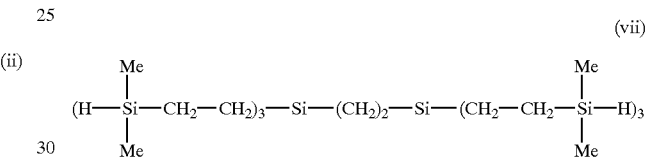

where Me is methyl; and a modified chloroplatinic acid catalyst.

22. The composition according to claim 16, made by blending a compound of formula (i)

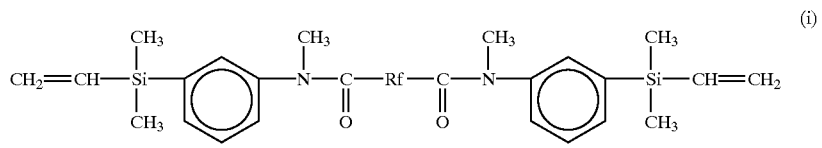

21. The composition according to claim 16, made by blending a compound of formula (ii)

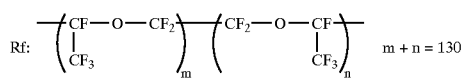

where Me is methyl; and and a compound of formula (viii)

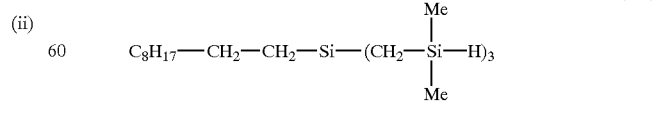

where Me is methyl; and a modified chloroplatinic acid catalyst.

* * * * *